Patented June 17, 1941

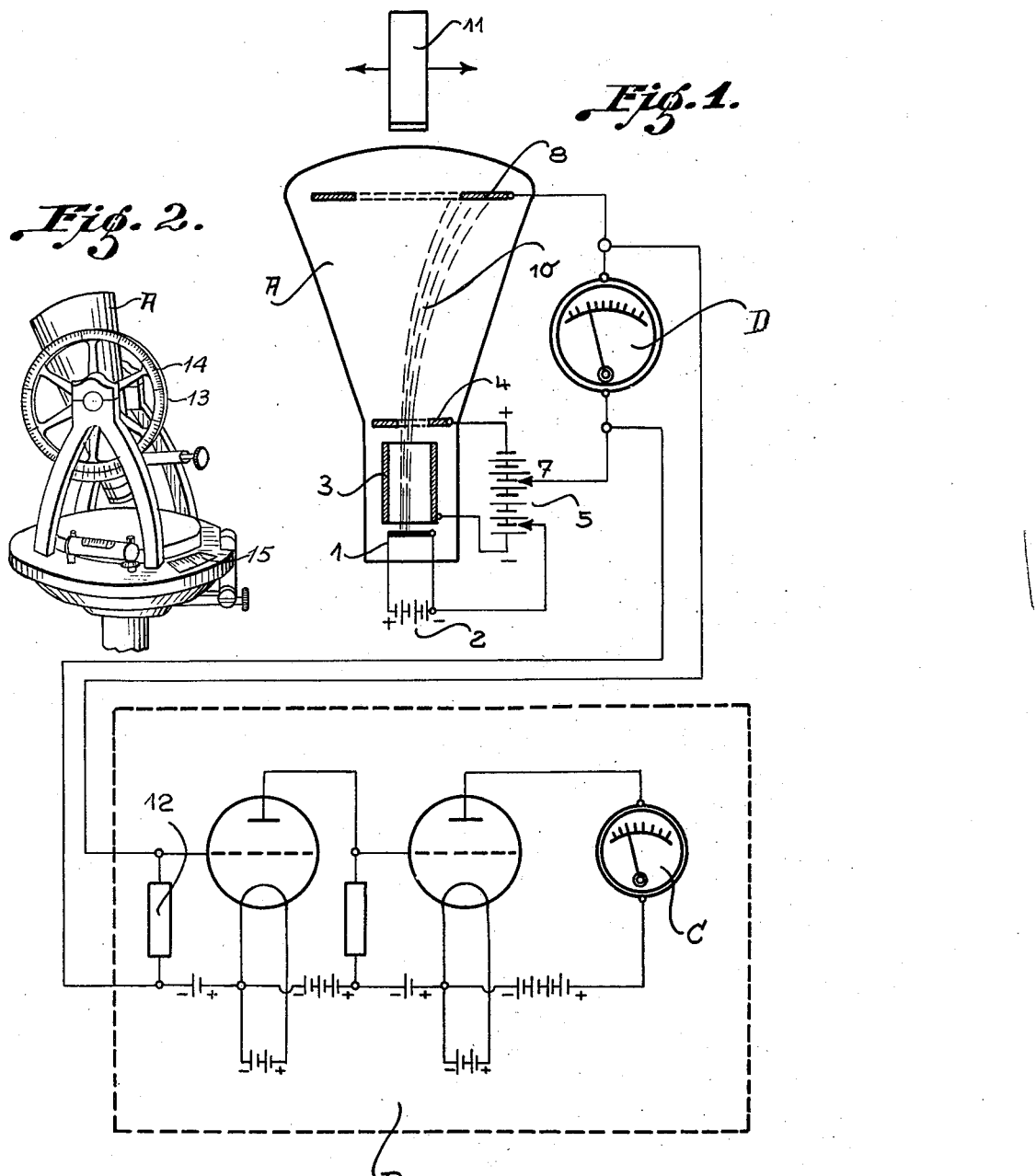

2,246,259

UNITED STATES PATENT OFFICE 2,246,259

APPARATUS FOR MAKING GEOPHYSICAL OR OTHER MEASUREMENTS

Ludwig Machts, Marburg, Germany

Application February 17, 1939, Serial No. 257,025
In Germany February 18, 1938

3 Claims. (Cl. 175—182)

This invention relates to apparatus for carrying out geophysical and other measurement.

It is known to ascertain local variations of the earth's magnetic field with the aid of Braun tubes and to determine approximately their order of magnitude. In this case the amount of deflection of the beam of electrons from its normal direction under the influence of the local magnetic forces, or the components acting upon the beam, are observed, and the tube itself is used as an indicating means, the displacement of the produced light spot being measured with respect to an assumed reference datum point on the illuminated screen, said point corresponding to the "normal" direction.

A measuring method of this kind is, however, suitable only for indicating relatively large values of field variations. It has, of course, been recognised that when a relatively low tube voltage is chosen the electrons travel at lower speeds so that the beam of electrons becomes more sensitive to the forces tending to deflect it; in any event attempts have been made to reduce the voltage to about 50 volts in spite of the fact that voltages of 200 are of the desired order from the point of view of satisfactorily working the tube.

When the voltage of the tube is reduced, the intensity of the light spot naturally also decreases, and, particularly when observations are made in daylight, such decreases may render the apparatus quite useless.

As against this, it is a primary object of the present invention to disclose a method which, while ensuring optimum results, is novel in that it abandons altogether the generating of an indicating light spot, and adopts instead a method relying only upon instruments for indicating the said variations of the electron stream. This method of indicating may be carried out by optical or acoustical means or by a combination of both. The abandoning of the method of indicating by means of a directly produced light spot enables a considerably lower value to be chosen for the tube voltage, for example of the order of magnitude of 4 volts, resulting in a manifold increase in sensitivity.

As a means of carrying the present invention into effect, use is made of an auxiliary electrode in the tube. Said electrode, which is preferably of annular form, partially or entirely surrounds the beam of electrons at a suitable point. When a deflection of the electron beam occurs, the latter impinges more or less upon the auxiliary electrode, and where a suitable circuit has been chosen, this in turn results in a corresponding alteration of the current flow between the anode and the auxiliary electrode, the alteration being amplified and subsequently shown on the indicating instrument. Also the amplification is effected by means of a correspondingly low voltage.

Use is preferably mode of an auxiliary magnet adapted to be displaced with respect to the tube in order that the beam of electrons may be controlled to a certain extent in such a manner as to provide a reference "zero" position intended to act as a basis for the indications obtained.

It is advantageous to mount the tube in such a manner that it may be pivoted in all directions, for example by means of a universal joint like a theodolite, so that the tube and with it the electron beam may be caused to be directed in a direction in space to suit the measuring conditions, while a reference zero position may always be determined with the aid of the aforesaid magnet, i. e., a position in which the beam passes freely through the electrode without touching any portion thereof.

A preferred position is one in which the beam extends vertically.

With the aid of an appliance according to the present invention, both the local electric field and the earth's magnetic field may be measured. The various electric and magnetic influences may be kept separate by means of suitable screening.

The instrument indications obtained with the appliance according to the present invention allow the greatest degree of fineness and variations of the fields to be investigated, without losing any of the relatively large differences, which are all that the known light spot method of indicating discloses. The sensitivity and thus also the entire measuring range of the appliance may of course be varied by varying the increase in sensitivity.

Finally, the instrument method of indicating also allows the observations made to be recorded in a particularly simple manner with the aid of recording apparatus known per se.

In the drawings, Fig. 1 illustrates a circuit wherein may be seen further advantageous details of a practical embodiment of the present invention, and Fig. 2 shows a universal mounting of theodolite type for mounting the tube orientably in three directions.

The tube A is equipped with a heating filament *I* fed from a battery 2 of the usual voltage. Above the filament there is disposed a Wehnelt cylinder 3 known per se, which serves to condense the rays into a beam, and above this cylinder there is disposed the anode 4 also known per se and preferably being of annular shape. An anode battery 5 is connected to the cylinder 3, the anode 4 and the heating system 1, in such manner that the filament 1 is negative with respect to the anode 4 but is positive with respect to the cylinder 3. As a rule the battery 2 provides 2-4 volts and, as already mentioned above, the anode voltage of the battery 5 amounts only to about 4-5 volts.

In the upper portion of the tube A there is disposed an auxiliary anode 8 of annular shape. Its centre opening is in the present case concentric with respect to the axis of the tube A and possesses a diameter such that the beam 10 of electrons may be deflected laterally to a certain extent without impinging upon the anode 8 or impinging only upon a very small portion thereof. With the aid of the deflecting magnet 11 which is arranged so as to be transversely displaceable above the tube A and above the anode 8, the beam 10 may at any time be so directed as to extend in a definite direction with respect to the auxiliary anode 8.

The anode 8 is connected, by means of an external lead in which an observing instrument D may be interposed, to a tap 7 on the anode battery 5, so that according to the intensity of the electron stream a measurably different current flows through the circuit thus established. There are parallel connections across the instrument D to a resistance 12 forming the input to an amplifier of known kind. In the amplifier the current is subject to low voltage amplification and is finally caused to operate the meter C.

In Fig. 2 I have illustrated by way of example a modified form of theodolite 13 in which the cathode ray tube A may be mounted for orientation in three directions. The theodolite has the usual vertical scale 14 for measuring the inclination of the tube and the horizontal scale 15 upon which may be read the declination. Thus the cathode ray tube as so mounted may be turned in any desired direction and by means of the two scales the inclination and declination of the magnetic field may be determined.

An appliance according to the present invention is preeminently suitable for carrying out geophysical measurements, since it is not only sensitive to the earth's natural magnetic field but also to the local electric fields, naturally existing or artificially generated, which influences are affected by irregularities existing locally in the earth's substrata, by pockets or by other factors and which influences may be measured with great accuracy and, if desired, recorded, while the appliance is moved over the surface of the earth. The same appliance may, however, be used in a similar manner for other purposes wherever magnetic or electric fields are to be investigated.

What I claim and desire to secure by Letters Patent of the United States is:

1. In an instrument for exploring magnetic fields, a cathode-ray tube adapted for operation on low voltage and having an annular anode positioned transverse of the electron stream from the cathode and positioned relatively near the cathode and further having an auxiliary annular electrode mounted substantially co-axial with said anode and positioned in said tube transverse of the electron stream and relatively remote from the cathode, means for supplying to said anode a potential positive with respect to said cathode, means for supplying to said auxiliary electrode a potential positive with respect to the cathode of value smaller than is supplied to said anode, and means for measuring the current delivered from said auxiliary electrode, said apparatus with particular reference to the interior diameters of said annular anode and auxiliary electrode and the respective positions of said anode and electrode being so constructed and arranged that when there is no non-axial magnetic field component acting on the tube substantially all of the electron stream will pass through the aperture in said auxiliary electrode, but under an applied non-axial component of magnetic field a portion of said electron stream will impinge on said auxiliary electrode whereby a current will flow through said measuring instrument.

2. In an instrument for exploring magnetic fields, a cathode-ray tube adapted for operation on low voltage and having an annular anode positioned transverse of the electron stream from the cathode and positioned relatively near the cathode and further having an auxiliary annular electrode mounted substantially co-axial with said anode and positioned in said tube transverse of the electron stream and relatively remote from the cathode, means for applying to said auxiliary electrode a potential positive with respect to the cathode of value smaller than is applied to said anode, and means for measuring the current delivered from said auxiliary electrode, the internal diameter and position of said annular auxiliary electrode being such that with the existing tube structure and associated voltage supply and anode structure, when there is no non-axial magnetic field component acting on the tube substantially all of the electron stream will pass through the aperture in said auxiliary electrode, but under an applied non-axial component of magnetic field a portion of said electron stream will impinge on said auxiliary electrode whereby a current will flow through said measuring instrument.

3. In an instrument for exploring magnetic fields, a cathode-ray tube adapted for operation on low voltage and having an annular anode positioned transverse of the electron stream from the cathode and positioned relatively near the cathode and further having an auxiliary annular electrode mounted substantially co-axial with said anode and positioned in said tube transverse of the electron stream and relatively remote from the cathode, means for applying to said auxiliary electrode a potential positive with respect to the cathode of value smaller than is applied to said anode, means for measuring the current delivered from said auxiliary electrode, and orienting means orientable in three dimensions for mounting said tube, said apparatus with particular reference to the interior diameters of said annular anode and auxiliary electrode and the respective positions of said anode and electrode being so constructed and arranged that when there is no non-axial magnetic field component acting on the tube substantially all of the electron stream will pass through the aperture in said auxiliary electrode, but under an applied non-axial component of magnetic field a portion of said electron stream will impinge on said auxiliary electrode whereby a current will flow through said measuring instrument.

LUDWIG MACHTS.